US006577768B1

(12) United States Patent
Ushida (10) Patent No.: US 6,577,768 B1
(45) Date of Patent: Jun. 10, 2003

(54) CODING METHOD, CODE CONVERTING METHOD, CODE CONVERTING APPARATUS, AND IMAGE FORMING APPARATUS (75) Inventor: Katsutoshi Ushida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,735

(22) Filed: Sep. 14, 1999

(30) Foreign Application Priority Data

Sep. 18, 1998 (JP) .......................................... 10-265185

(51) Int. Cl.[7] .............................. G06K 9/36; G06K 9/46
(52) U.S. Cl. ............. 382/238; 358/426.02; 358/426.13; 382/239; 382/245
(58) Field of Search ................................ 382/232, 234, 382/238, 239, 244–246; 358/426.02, 426.04, 426.13; 341/51, 65, 67, 107

(56) References Cited

U.S. PATENT DOCUMENTS

| 5,587,798 | A | * | 12/1996 | Kurita et al. ................ 382/245 |
| 5,655,032 | A | * | 8/1997 | Ohsawa et al. .............. 382/238 |
| 5,859,604 | A | * | 1/1999 | Slattery et al. .............. 341/107 |
| 5,991,450 | A | | 11/1999 | Ohsawa et al. .............. 382/245 |
| 6,002,814 | A | * | 12/1999 | Chadez ........................ 382/234 |
| 6,025,932 | A | * | 2/2000 | Imanaka ...................... 382/238 |

OTHER PUBLICATIONS

Kou, Digital Image Compression Algorithms and Standards, Jan. 1995, pp. 55–67.*

* cited by examiner

Primary Examiner—Timothy M. Johnson
(74) Attorney, Agent, or Firm—Fitzpatrick, Cella, Harper & Scinto (57) ABSTRACT This invention relates to a coding method, code converting method and apparatus, and image forming apparatus and, more particularly, to a coding method, code converting method and apparatus, and image forming apparatus capable of high-speed conversion data coded by different coding method. When data is converted between different coding methods, e.g., when data encoded by a run-length coding method is re-encoded by a coding method using typical prediction, the data is conventionally temporarily decoded into original data before encoding and then re-encoded. In this invention, data subjected to coding such as MH, MR, or MMR as run-length coding is decoded into run-length information as intermediate data, and typical prediction is performed in this state. This increases the speed of conversion from run-length coded data to coded data using typical prediction.

38 Claims, 9 Drawing Sheets

CODING METHOD, CODE CONVERTING METHOD, CODE CONVERTING APPARATUS, AND IMAGE FORMING APPARATUS

BACKGROUND OF THE INVENTION

1. Field of the Invention

The present invention relates to a coding method, code converting method and apparatus, and image forming apparatus and, more particularly, to a coding method, code converting method and apparatus, and image forming apparatus capable of high-speed conversion of data coded by different coding methods.

2. Description of the Related Art

In data communication, data is generally compressed before transmission and expanded on a receiving side in order to increase the efficiency of communication. Also, data is often compressed before storage to efficiently use the capacity of a storage medium. Especially in image communication which handles large amounts of data, data compression is an important subject, so various systems have been studied and employed.

In facsimile apparatuses as one type of image forming apparatuses, MH coding, MR-coding, and MMR coding recommended by T.4 and T.6 of ITU-T have been used as image data electrical transmission coding methods. These coding methods are kinds of an entropy coding method using binary run-length information. Therefore, in encoding MH codes, MR codes, and MMR codes, run-length data representing the continuations of black and white pixels by numerical values is usually formed as intermediate data, and this data is encoded under various conditions. Likewise, in data decoding, original image data is obtained through run-length data.

Recently, a JBIG coding method is recommended by T.85 of ITU-T as a high-efficiency binary data coding method replacing the conventional MH coding, MR coding, and MMR coding, and is beginning to be used as an electric transmission code in facsimile apparatuses. This JBIG coding defines two different coding methods: sequential coding and progressive coding. Facsimile apparatuses use ITU-T T.85 recommendation that is extended from the sequential method recommended by T.82 of ITU-T so as to be able to handle data which is unknown in the longitudinal direction.

The JBIG coding predicts whether a pixel to be encoded is white or black, from surrounding pixels (template) of the pixel to be encoded, and performs coding (arithmetic coding) on the basis of the probability of this prediction. The JBIG coding is much more efficient than the conventional MH coding, MR coding, and MMR coding. However, it is necessary to form a context from surrounding pixels and update a context table for each processing. This complicates the processes and requires large resources for coding.

The JBIG coding employs TP (Typical Prediction) to reduce the processes required for coding. Practical processing is as follows. In the sequential JBIG coding method used in facsimile apparatuses, whether one-line data to be presently encoded is the same as data of the preceding line is checked. If the two data are the same, it is determined that TP (Typical Prediction) from the data of the preceding line is possible, and a flag indicating this information is set so as not to encode the data of the present line to be encoded.

In either case, however, the JBIG coding is not a run-length coding method such as the MH coding, MR coding, or MMR coding. Therefore, to perform code conversion between JBIG codes and MH, MR, and MMR codes, it is conventionally necessary to once convert (decode) all coded data into raw image data and perform desired coding.

As described above, to convert into JBIG codes using no run length from MH, MR, and MMR codes using run length, or from MH, MR, and MMR codes accompanying non-compression, the codes must be once converted into an uncompressed raw image by decoding. This makes high-speed code conversion difficult.

For example, when image data are stored using run-length codes such as MH codes and are transmitted using JBIG codes in an image forming apparatus such as a facsimile apparatus, these codes must be converted in both transmission and reception; the stored codes must be converted into JBIG in transmission, and JBIG must be converted into the stored codes in reception. Accordingly, high-speed code conversion is essential to improve the overall throughput.

SUMMARY OF THE INVENTION

The present invention has been made in consideration of the above prior art, and has as its object to provide high-speed methods and apparatuses of encoding, decoding, and code conversion, and an image forming apparatus using these methods and apparatuses.

One aspect of the present invention lies in a coding method of coding input data by using typical prediction, characterized in that the input data is coded by a coding method different from a coding method using the typical prediction, and the typical prediction is performed by using the coded data.

Another aspect of the present invention lies in a coding method of coding input data by using typical prediction, characterized in that the input data is coded by a coding method different from a coding method using the typical prediction, and the typical prediction is performed by using the input data if an amount of the coded data is smaller than an amount of data to be coded by the different coding method, and by using the data to be coded by the different coding method if not.

Still another aspect of the present invention lies in a code converting method of converting first coded data coded by a first coding method using typical prediction into second coded data coded by a second coding method different from the first coding method, characterized by comprising the step of converting a portion of the first coded data, which is found to be typically unpredictable by the typical prediction, into intermediate data of the second coding method.

Still another aspect of the present invention lies in a code converting method of converting first coded data formed by coding original data by a first coding method into second coded data coded by a second coding method, characterized by comprising the conversion step of converting the first coded data into intermediate data between the first coded data and the original data, the prediction step of performing typical prediction by using a predetermined unit of the intermediate data and obtaining a prediction result, and the encoding/decoding step of encoding the intermediate data into the second coded data if the prediction result indicates that the typical prediction is possible, and decoding the intermediate data into the original data and performing the second coding if the prediction result indicates that the typical prediction is impossible.

Still another aspect of the present invention lies in a code conversion method of converting first coded data formed by coding original data by a first coding method into second coded data coded by a second coding method, characterized in that the second coding is performed by using intermediate data generated in a course of performing the first coding method.

Still another aspect of the present invention lies in a coding apparatus comprising typical predicting means for performing typical prediction for input data, and coding means for performing a predetermined coding method using the typical prediction, characterized in that the input data is coded by a coding method different from the predetermined coding method.

Still another aspect of the present invention lies in a code converting apparatus for converting first coded data coded by a first coding method using typical prediction into second coded data coded by a second coding method different from the first coding method, characterized by comprising detecting means for detecting, from the first coded data, a portion found to be typically unpredictable by the typical prediction, and converting means for converting the detected portion into intermediate data in the second coding method.

Still another aspect of the present invention lies in a code converting apparatus for converting first coded data formed by coding original data by a first coding method into second coded data coded by a second coding method, characterized by comprising converting means for converting the first coded data into intermediate data between the first coded data and the original data, predicting means for performing typical prediction for each predetermined unit of the intermediate data and outputting a prediction result, and encoding/decoding means for encoding a predetermined range of the intermediate data found to be typically predictable by the prediction result, and decoding a predetermined range found to be typically unpredictable into the original data and encoding the original data into the second coded data.

Still another aspect of the present invention lies in an image forming apparatus for coding and outputting image data, characterized by comprising image data input means, first encoding means for encoding the image data by a first coding method and saving the data as first coded data, decoding means for decoding the first coded data into intermediate coded data generated in a course of encoding by the first coding method, and second encoding means for encoding the intermediate coded data by a second coding method different from the first coding method and outputting the data as second coded data.

Still another aspect of the present invention lies in a coding apparatus for coding input data by using typical prediction, characterized by comprising predicting means for performing the typical prediction, coding means for coding the input data on the basis of a prediction result from the predicting means, wherein the input data is coded by a coding method different from the coding method using the typical prediction, and the predicting means performs the typical prediction by directly using the input data.

Still another aspect of the present invention lies in a coding apparatus for coding input data by using typical prediction, characterized in that the input data is coded by a coding method different from a coding method using the typical prediction, the apparatus comprises predicting means for performing the typical prediction, coding means for coding the input data on the basis of a prediction result from the predicting means, and original data amount detecting means for detecting an amount of original data before the input data is coded by the different coding method, and the predicting means performs the typical prediction by directly using the input data if the amount of the original data is smaller than an amount of the input data, and performs the typical prediction by using the original data if not.

Still another aspect of the present invention lies in a coding apparatus for converting first coded data coded by a first coding method using typical prediction into second coded data coded by a second coding method different from the first coding method, characterized by comprising detecting means for detecting, from the first coded data, a portion found to be typically unpredictable by the typical prediction, and data converting means for converting the portion found to be typically unpredictable into intermediate data of the second coding method.

Still another aspect of the present invention lies in a coding apparatus for converting first coded data formed by coding original data by a first coding method into second coded data coded by a second coding method, characterized by comprising converting means for converting the first coded data into intermediate data between the first coded data and the original data, predicting means for performing typical prediction using a predetermined unit of the intermediate data and obtaining a prediction result, and encoding/decoding means for encoding the intermediate data into the second coded data if the prediction result indicates that the typical prediction is possible, and decoding the intermediate data into the original data and performing the second coding if the prediction result indicates that the typical prediction is impossible.

Still another aspect of the present invention lies in a coding apparatus for converting first coded date formed by coding original data by a first coding method into second coded data coded by a second coding method, characterized by comprising decoding means for decoding the first coded data into intermediate data generated in a course of performing the first coding method, and encoding means for performing the second coding by using the intermediate data.

Still another aspect of the present invention lies in a computer readable storage medium storing a control program of an image forming apparatus for coding and outputting image data, characterized by comprising a program of the image data input step, a program of the first encoding step of encoding the image data by a first coding method and saving the data as first coded data, a program of the decoding step of decoding the first coded data into intermediate coded data generated in a course of encoding by the first coding method, and a program of the second encoding step of encoding the intermediate coded data by a second coding method different from the first coding method and outputting the data as second coded data.

Still another aspect of the present invention lies in a computer readable storage medium storing a control program of a coding apparatus for coding input data by using typical prediction, characterized by comprising a program of the prediction step of performing the typical prediction, and a program of the coding step of coding the input data on the basis of a prediction result in the prediction step, wherein the input data is coded by a coding method different from the coding method using the typical prediction, and the prediction step comprises performing the typical prediction by directly using the input data.

Still another aspect of the present invention lies in a computer readable storage medium storing a control program of a coding apparatus for coding input data by using typical prediction, characterized in that the input data is coded by a coding method different from a coding method using the typical prediction, the storage medium comprises a program of the prediction step of performing the typical prediction, a program of the coding step of coding the input data on the basis of a prediction result in the predicting step, and a program of the original data amount detection step of detecting an amount of original data before the input data is coded by the different coding method, and the prediction step comprises performing the typical prediction by directly using the input data if the amount of the original data is smaller than an amount of the input data, and performs the typical prediction by using the original data if not.

Still another aspect of the present invention lies in a computer readable storage medium storing a control program of a coding apparatus for converting first coded data coded by a first coding method using typical prediction into second coded data coded by a second coding method different from the first coding method, characterized by comprising a program of the detection step of detecting, from the first coded data, a portion found to be typically unpredictable by the typical prediction, and a program of the data conversion step of converting the portion found to be typically unpredictable into intermediate data of the second coding method.

Still another aspect of the present invention lies in a computer readable storage medium storing a program code of a coding apparatus for converting first coded data formed by coding original data by a first coding method into second coded data coded by a second coding method, characterized by comprising a program of the conversion step of converting the first coded data into intermediate data between the first coded data and the original data, a program of the prediction step of performing typical prediction using a predetermined unit of the intermediate data and obtaining a prediction result, and a program of the encoding/decoding step of encoding the intermediate data into: the second coded data if the prediction result indicates that the typical prediction is possible, and decoding the intermediate data into the original data and performing the second coding if the prediction result indicates that the typical prediction is impossible.

Still another aspect of the present invention lies in a computer readable storage medium storing a control program of a coding apparatus for converting first coded data formed by coding original data by a first coding method into second coded data coded by a second coding method, characterized by comprising a program of the decoding step of decoding the first coded data into intermediate data generated in a course of performing the first coding method, and a program of the encoding step of performing the second coding by using the intermediate data.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will be described in detail below with reference to the accompanying drawings. This embodiment will be explained by taking the case in which the present invention is applied to a facsimile apparatus. However, the present invention can be used for any other application.

First, the arrangement of a facsimile apparatus having a code converter according to this embodiment will be explained. Explanations of encoding and decoding of JBIG codes and MR codes using non-compression together follow. Finally, code conversion between MR codes using non-compression together and JBIG codes will be described.

Figure 1:
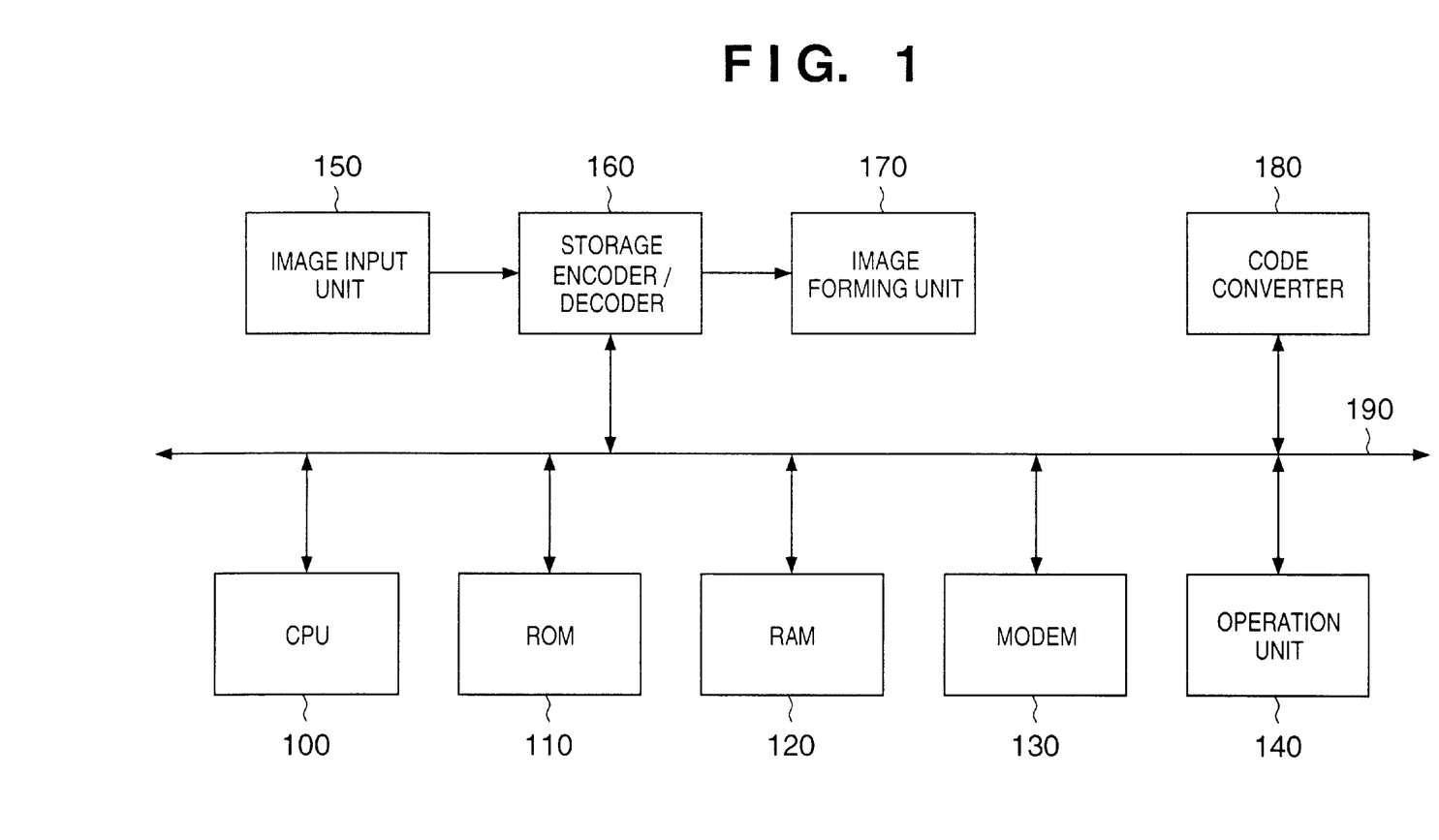
FIG. 1 is a block diagram showing the arrangement of a facsimile apparatus as one embodiment of the present invention.

FIG. 1 is a block diagram of a facsimile apparatus as one embodiment of the present invention. The facsimile apparatus according to this embodiment uses MR coding using non-compression together in image data storage and JBIG coding in data transmission. Referring to FIG. 1, a CPU 100 controls the whole facsimile apparatus. A ROM 110 stores program codes of the CPU and data such as font information. A RAM 120 is used as a work memory of the CPU, an image memory for storing image data encoded by storage codes (to be described later), or a transmission/reception buffer for temporarily storing coded data for a line. A modem 130 modulates and demodulates data to transmit and receive data with respect to the line. That is, the modem 130 transmits data stored in the transmission/reception buffer to the line while modulating the data and stores data received from the line into the transmission/reception buffer while demodulating the data.

An operation unit 140 has keys and a display and provides man-machine I/F of the facsimile apparatus. An image input unit 150 is, e.g., a scanner. This image input unit 150 scans an original by a photoelectric converting element such as a CCD and performs image processing by converting the read image information into digital information by using an A/D converter (not shown). Finally, the image input unit 150 outputs black-and-white binary image data to a storage encoder/decoder 160.

The storage encoder/decoder 160 encodes this binary raw image data into MR codes using non-compression in units of lines together, as storage codes (to be described later) in the apparatus, and decodes the data from MR codes. In encoding, the storage encoder/decoder 160 receives binary raw image data from the scanner 150, converts the data into MR codes using non-compression in units of lines together, and stores the codes in an image memory 160 (to be described later). In decoding, the storage encoder/decoder 160 decodes input MR codes using non-compression in units of lines together from the image memory 160 and outputs binary image data to an image forming unit 170 which is, e.g., a printer. This image forming unit 170 receives the binary raw image data decoded and output from the storage encoder/decoder 160, converts the resolution in accordance with the output resolution of the image forming unit by using a resolution converter (not shown), and also converts the printing material size. After that, the image forming unit 170 forms an image on a printing medium.

A code converter 180 is the characteristic feature of this embodiment. The code converter 180 performs conversion between MR codes using non-compression together, stored in an image data storage area (to be referred to as an image memory hereinafter) of the RAM 120, and MH, MR, MMR and JBIG codes for line transmission and reception. In image data transmission, the code converter 180 reads out image data encoded by MR codes using non-compression together from the image memory, converts the image data into codes corresponding to a transmission partner apparatus, and outputs the codes to a transmission/reception buffer area (to be referred to as a transmission/reception buffer hereinafter). If necessary, the code converter 180 enlarges or reduces the image data in accordance with the capability of the transmission partner apparatus.

The data temporarily stored in the transmission/reception buffer is transmitted to the opposite apparatus (not shown) via the modem 130. In reception, encoded image data received by the modem 130 is temporarily stored in the transmission/reception buffer. The encoded data stored in the transmission/reception buffer (120) is input to the code converter 180 and converted into MR codes using non-compression together as storage codes. The converted codes are stored in the image memory.

In the arrangement shown in FIG. 1, the code converter 180 exists as an independent constituent element in the facsimile apparatus. However, the CPU (100) can, of course, also operate as a code converter by executing programs. If this is the case, program codes concerning the code conversion process can be stored in the ROM (110) or read out from an external storage (not shown) and developed on the RAM 120. When the CPU 100 performs code conversion, the code converter 180 in FIG. 1 is unnecessary.

Figure 2A:
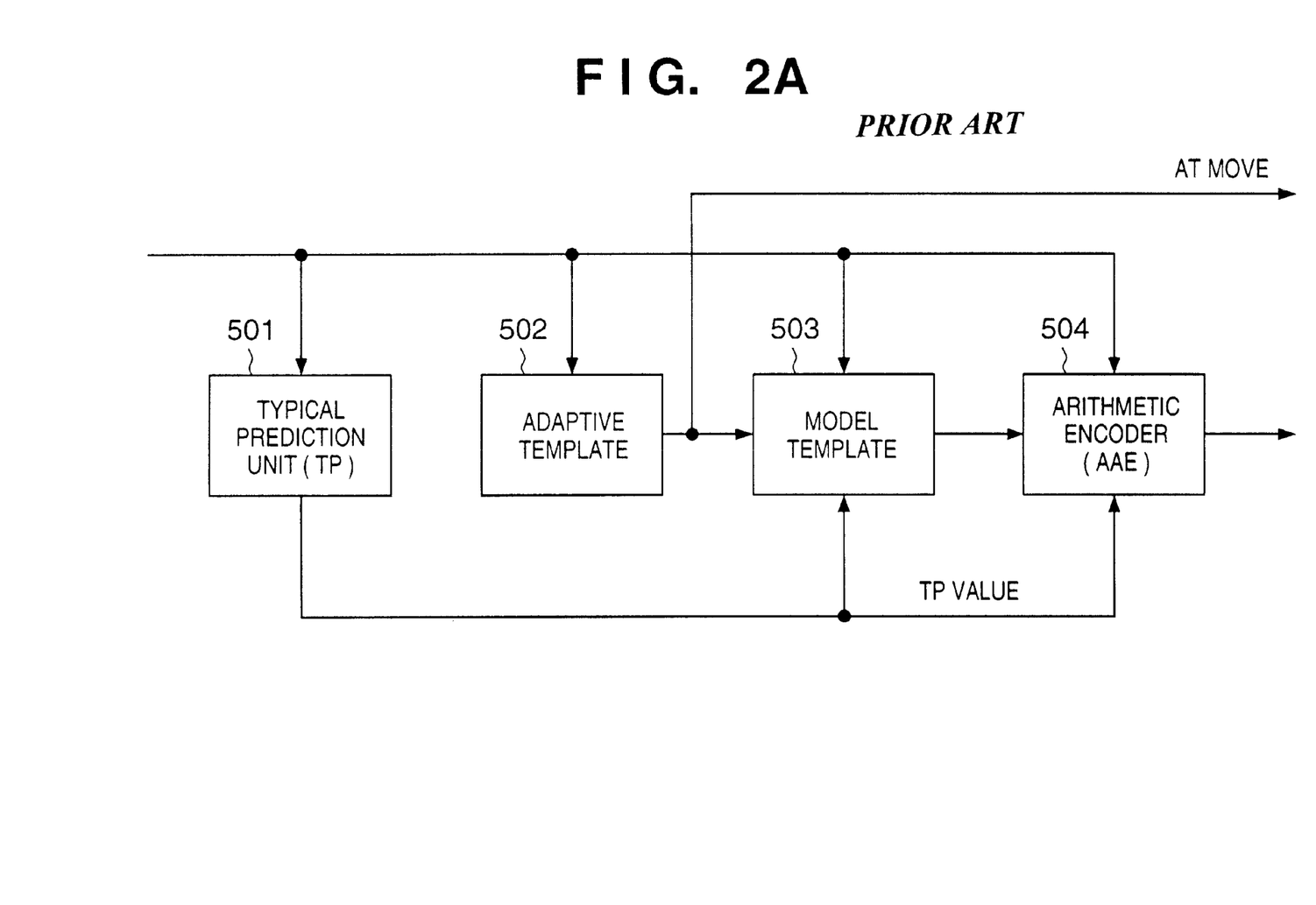
FIGS. 2A and 2B are block diagrams showing outlines of the arrangements of a JBIG encoder and a JBIG decoder.
Figure 2B:
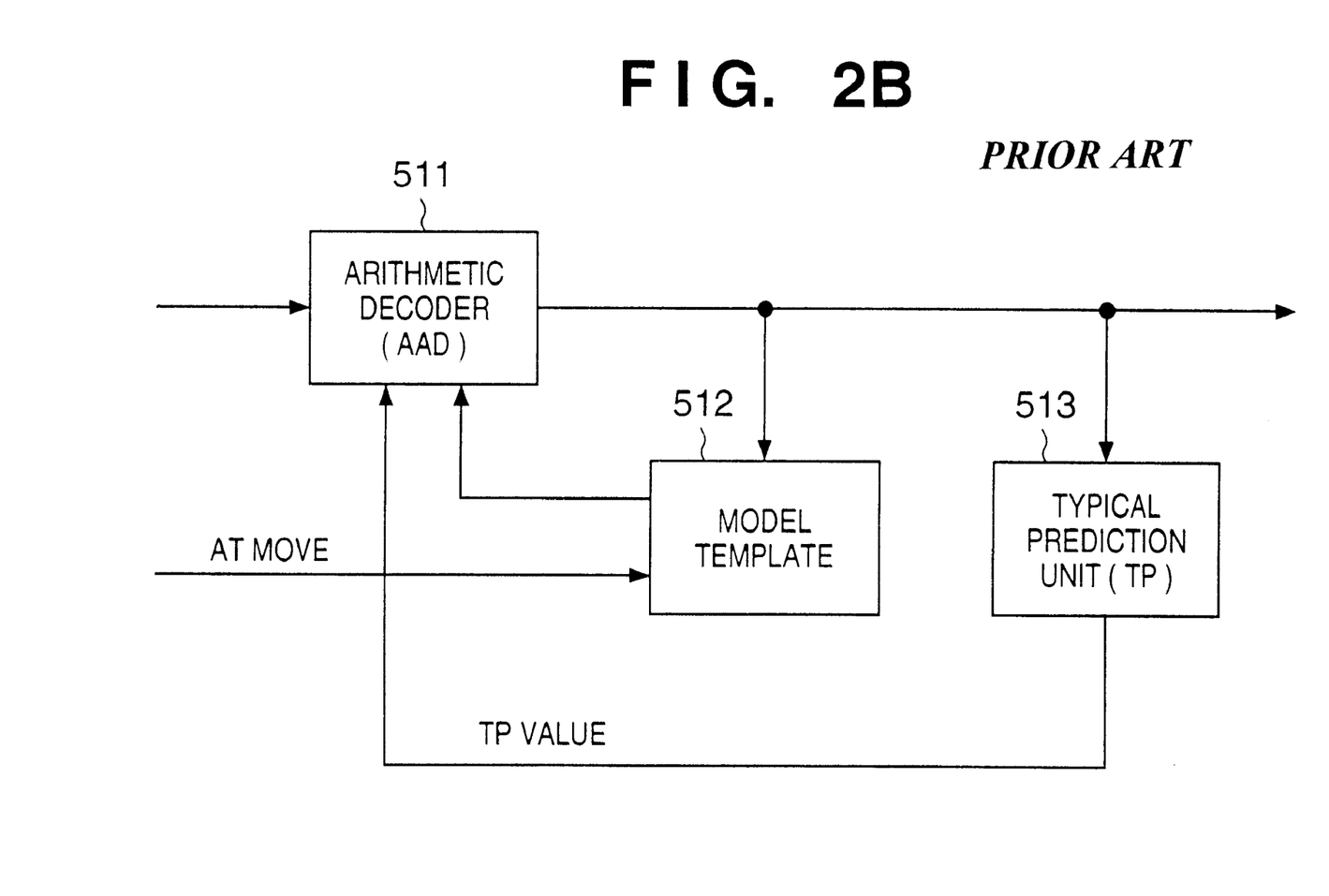

Sequential JBIG encoding and decoding processes will be briefly described below with reference to FIGS. 2A and 2B. FIGS. 2A and 2B are block diagrams showing outlines of the arrangements of a JBIG encoder and a JBIG decoder, respectively. In sequential JBIG, encoding is performed by Typical Prediction unit (TP) 501, an adaptive template 502, a model template 503, and an arithmetic encoder (AAE) 504. Decoding is performed, in the reverse flow, in the order of an arithmetic decoder (AAD) 511, a model template 512, and Typical Prediction unit (TP) 513. Details of the adaptive template 502, the model templates 503 and 512, the arithmetic encoder (AAE) 504, and the arithmetic decoder (AAD) 512 are described in the aforementioned ITU-T recommendation, so a detailed description thereof will be omitted.

The Typical Prediction unit(TP) 501 checks whether a line to be encoded is the same as the preceding line, and determines the value of data LNTP (Line not Typical) indicating the presence/absence of prediction failure. Assume that LNTP=0 if a line to be encoded and the preceding line are the same, and LNTP=1 if not. When LNTP=0, typical prediction is possible, so the arithmetic encoder in the subsequent stage generates only codes for temporary pixels (to be described later) without generating any codes for that line.

In actual encoding, the LNTP is not directly used, and SNLTP represented by $$\text{SNLTP}y=! \text{ (exclusive OR of LNTP}y \text{ and LNTP}y-1) \tag{1}$$

is used as a temporary pixel for a template for generating a context of an arithmetic code. In equation (1), y represents a line to be encoded, and y−1 represents the preceding line of this line to be encoded. An '!' operator represents logical negation (logical NOT). That is, the SNLTP is 1 if the LNTP of the line to be encoded and the LNTP of the preceding line have the same value.

A description of a template for a temporary pixel will be also omitted. In decoding, the arithmetic decoder (AAD) 511 decodes data by using a template for the first temporary pixel of the line and determines the value of the SNLTP. The AAD 511 calculates the LNTP by $$\text{LNTP}y=! \text{ (exclusive OR of SLNTP}y \text{ and LNTP}y-1) \tag{2}$$

If LNTP=0, the data of the preceding line is directly copied.

Codes using non-compression together as storage codes of this embodiment will be described below. In MH codes, MR codes, and MMR codes, Huffman codes are assigned on the basis of statistical data of run-length information of character/line images. Therefore, image data having a large number of black-and-white inversions such as a pseudo halftone undesirably expands in data amount. Especially when MH, MR, or MMR codes are directly used as storage codes, the load of a data bus and the throughput of an encoder/decoder must be set by taking the worst value during expansion into consideration. This significantly enlarges the apparatus. To solve this inconvenience, codes using non-compression in units of lines together are used as storage codes instead of directly using the above codes.

Figure 3A:
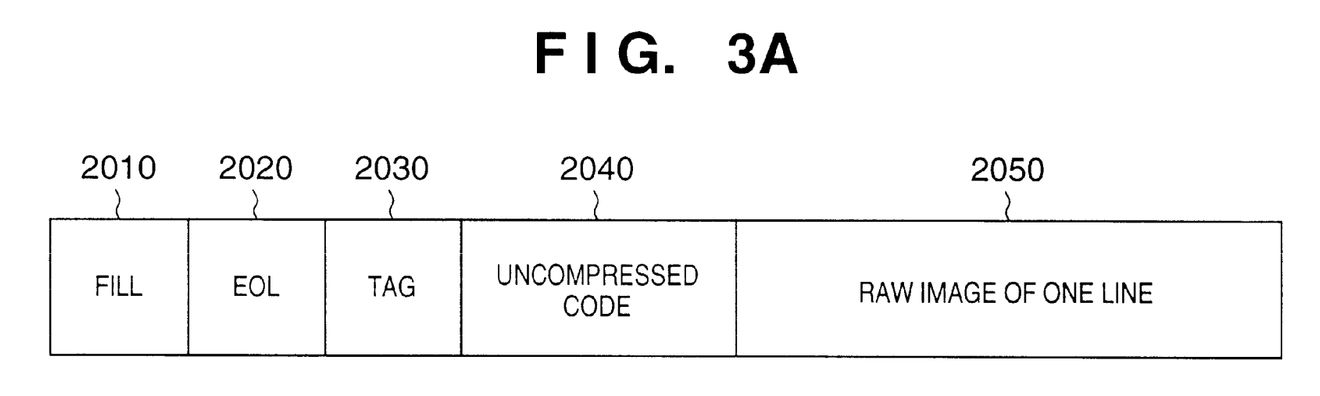
FIGS. 3A and 3B are views showing the data formats of MR codes using non-compression together.
Figure 3B:
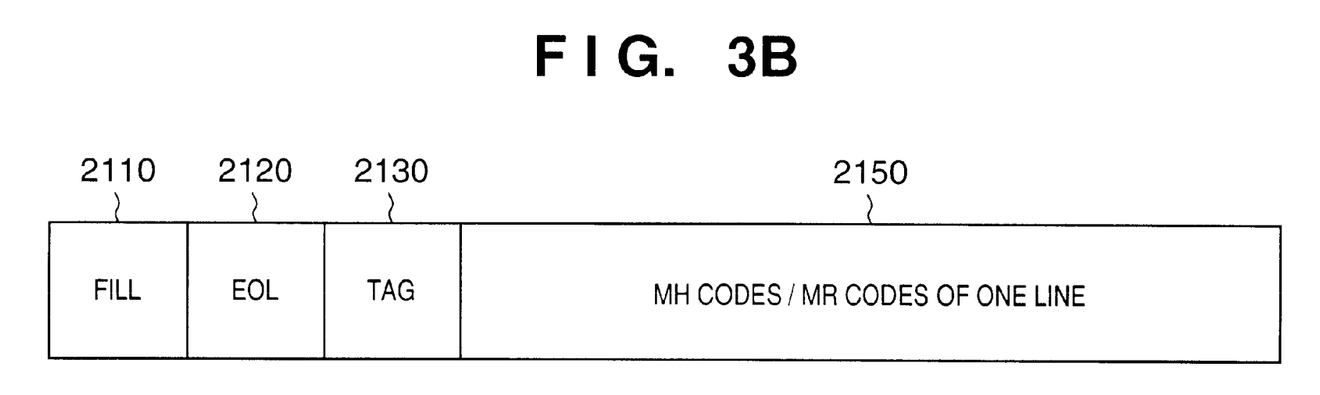

When MR codes using non-compression in units of lines together according to this embodiment are used, whether the amount of encoded data of one line is larger than the data amount of an uncoded raw image (or whether encoded data of one line is larger than a specific threshold value) is checked. If the encoded data amount of the line is larger, this line is not encoded, and an identification code indicating that the line is an uncompressed line is added to the start position of this line, and the uncoded raw image data is directly connected to this identification code. FIGS. 3A and 3B are views showing the formats of uncompressed codes in units of lines based on MR codes.

FIG. 3A shows an uncompressed line, and FIG. 3B shows a compressed line. In data of one page, data of uncompressed lines or compressed lines are sequentially generated in accordance with determination, and an RTC (control return code) indicating the end of page is added to the end position. As this RTC, a code in which an EOL (to be described later) is repeated a predetermined number of times is used. Reference numerals 2020 and 2120 denote EOLs, and a code "000000000001" is set. Reference numerals 2030 and 2130 denote TAG bits for discriminating between a one-dimensional code and a two-dimensional code. A one-dimensional or two-dimensional TAG is set in accordance with a K parameter as a parameter of an MR code. One-dimensional TAG bits are used for uncompressed lines.

As an uncompressed line identification code 2040, a code not existing in a code table is assigned. In this embodiment, a code "000000001" is used as a non-compression transition code. In raw image data 2050, image data of a corresponding line is directly inserted. In encoded data 2150, one- or two-dimensional codes corresponding to the TAG bit (2130) are inserted. FILL bits 2010 and 2110 are inserted before the EOLs (2020 and 2120). 0 is inserted, where necessary, as this FILL bit so that the boundary between the uncompressed identification code and the raw image is a byte boundary (i.e., so that the data is segmented by a multiple of 8 bits). The main objective of this byte boundary adjustment using the FILL bit is to increase the speed of CPU processing.

Figure 4:
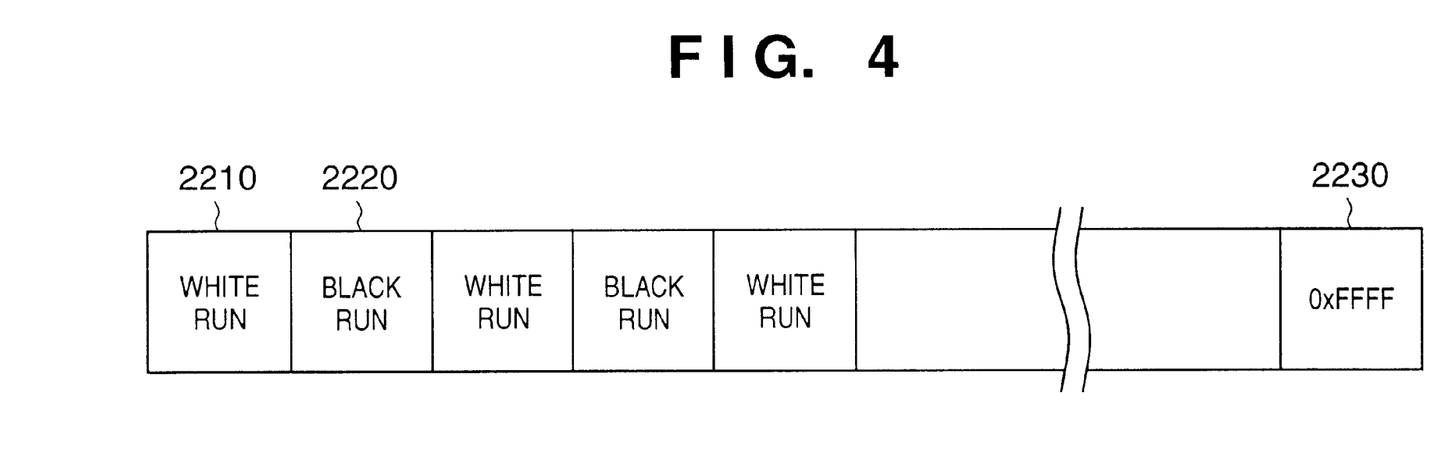
FIG. 4 is a view showing the format of run-length data.

FIG. 4 shows the format of run-length data as intermediate data generated in encoding and decoding for MH, MR, and MMR codes. The numbers of successive white and black pixels are represented by numerical values in units of 2 bytes (16 bits). The value of each run length indicates the length of continuation of the same color. WHITE RUN is the number of consecutive white pixels, and BLACK RUN is the number of consecutive black pixels. For example, if the same color continues over three pixels, the run length is 3. Black and white in one line are discriminated from each other by defining the first run of the line is a white run because white and black runs always alternately appear. Accordingly, a line always starts from a white run, 2-byte run-length data of white and black runs are alternately arranged, and "0XFFFF" ("0X" indicates that the following characters represent a hexadecimal number) is inserted as a line end code 2230 in the end position.

In an ordinary original of characters and lines, one line is completely white at a probability of 40%. For example, so the number of horizontal pixels is 1,728 in an ISO A4-size original, the data amount of a raw image is 1,728/8=216 bytes. However, in run-length intermediate data, a white run of 1,728 pixels is 2 bytes ("010011011"), so this white run and 2 bytes of the end code described above can be represented by a total of 4 bytes. It is, therefore, readily understood that in TP determination in which each line is compared with the preceding line, the operation amount is smaller and the processing speed is higher when run-length data is used than when a raw image is used. Also, if TP hits continue, a line not requiring original data for reference is generated in the arithmetic encoder. If this is the case, the processing speed is further increased by skipping conversion, between run-length data and a raw image, for forming reference data.

Figure 5:
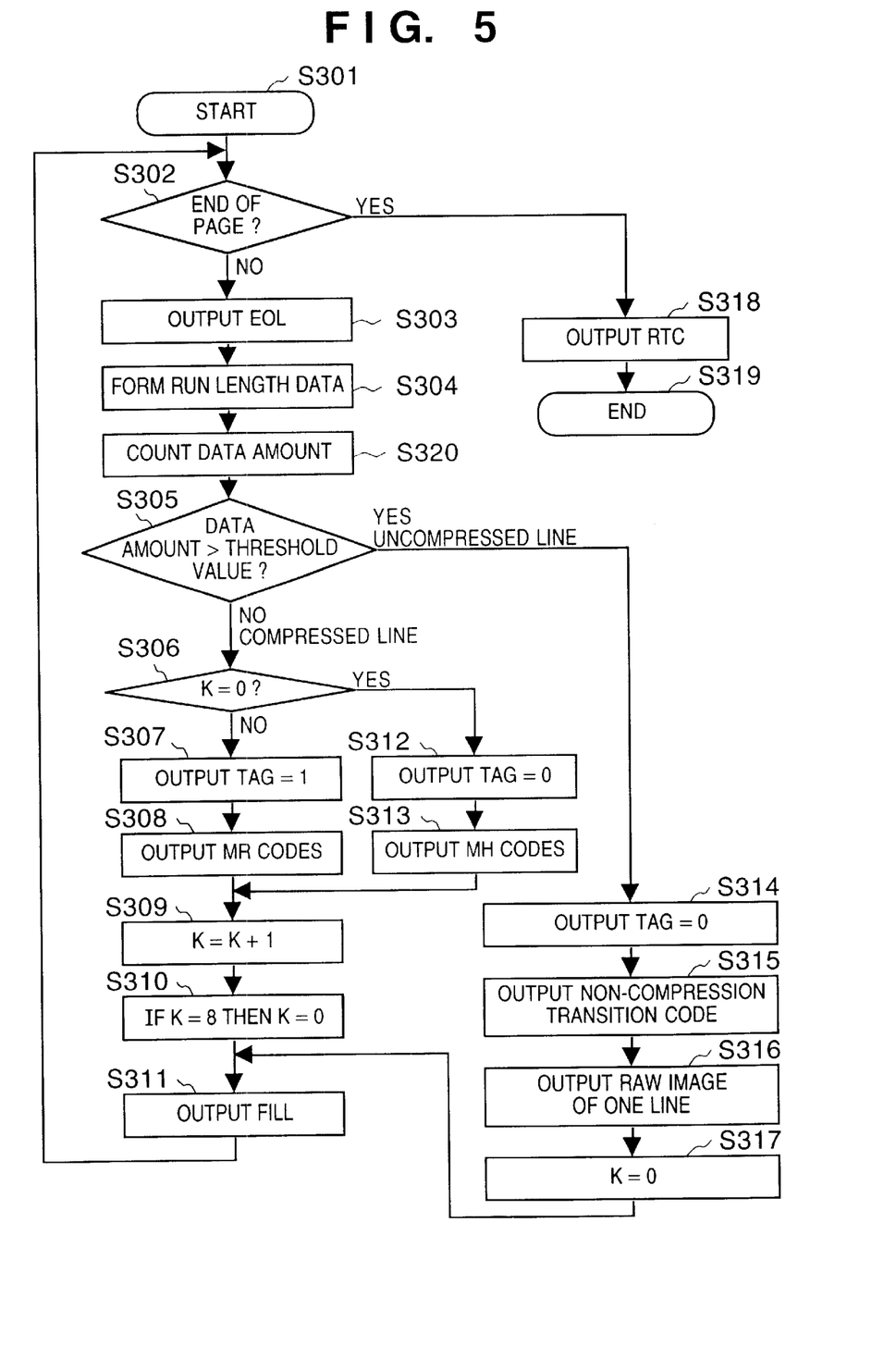
FIG. 5 is a flow chart for encoding MR codes using non-compression together.

FIG. 5 is a flow chart showing the operation when uncompressed MR codes are encoded. The flow starts from step S301, and whether processing of one page is completed is checked in step S302. If the processing of one page is not completed, the flow branches to step S303. If the processing of one page is completed, the flow branches to step S318 to complete the processing of one page, i.e., an RTC is output in step S318, and the operation is ended in step S319. In step S303, the aforementioned EOL code is output as a code. In step S304, run-length data described previously is generated from one-line input image data. The data amount of the generated run-length data is counted (S320). If in step S305 this count value exceeds a specific threshold value, it is determined that this line is an uncompressed line, and the flow branches to uncompressed line processing starting from step S314. If not, the flow branches to a normal MR coded data output process starting from step S306.

In this embodiment, the determination of transition to non-compression is done on the basis of run-length data, rather than of actual encoded data. This is because MH and MR codes have a certain correlation in coding efficiency and an actual code amount with run-length data, so no problem arises even when the run length is used in the determination of transition to non-compression. At the same time, the upper limit of the data amount of run length in a compressed line can be set. This results in the advantage that when this code is converted into JBIG, the upper limit of the operation amount of a TP determination process (to be described later) using a run length can be defined.

If the line is not an uncompressed line, the flow advances to step S306 to check whether a counter for the K parameter is 0. This K parameter is inserted into an MH encoded line at predetermined intervals to prevent propagation of errors caused by transmission errors. In this embodiment, the K parameter is set to 8. If the K parameter is 0, MH codes as one-dimensional codes are output; if not, MR codes as two-dimensional codes are output.

To generate MR codes, the flow advances to processing starting from step S307. To generate MH codes, the flow branches to step S312. First, the generation of MR codes will be described. In step S307, 1 is output as a TAG bit indicating an MR coded line. In step S308, the run-length data generated in step S304 is used to process MR codes of one line and output the coded data. In step S309, the counter for the K parameter is updated by incrementing the counter by one. In step S310, whether the counter value of the K parameter is equal to the preset value (8) of the K parameter is checked. If YES in step S310, the counter is returned to 0. In step S311, a FILL bit 0 for matching the data boundary with byte padding is output where necessary. The flow returns to step S302.

On the other hand, if MH codes are to be generated because K=0, the flow advances to step S312, and 0 is output as a TAG bit indicating that this line is MH codes. In step S313 the run-length data generated i n step S304 is used to generate and output MH codes of one line. After that, the processes in steps S309, S310, and S311 are performed as in the case of MR codes, and the flow returns to step S302.

If the run-length data amount exceeds the threshold value in step S305, an uncompressed line is generated. To generate an uncompressed line, 0 indicating a horizontal code is output as the TAG bit in step S314. This is to reduce the determination process in the decoder. In step S315, "000000001" as a non-compression transition code indicating that this line is uncompressed is output. In step S316, the input one-line raw image data is directly output. In step S318, the counter of the K parameter is set to 0. FILL is output in step S311, and the flow returns to step S302. In this processing, the K parameter counter is set to 0 when the data of the uncompressed line is output, and the next line is encoded by MH coding. This is so because if the next line after non-compression transition is encoded by MR coding, the probability of expansion is usually high, and because the operation amount increases when MR codes are generated by using an uncompressed line as a reference line.

Figure 6:
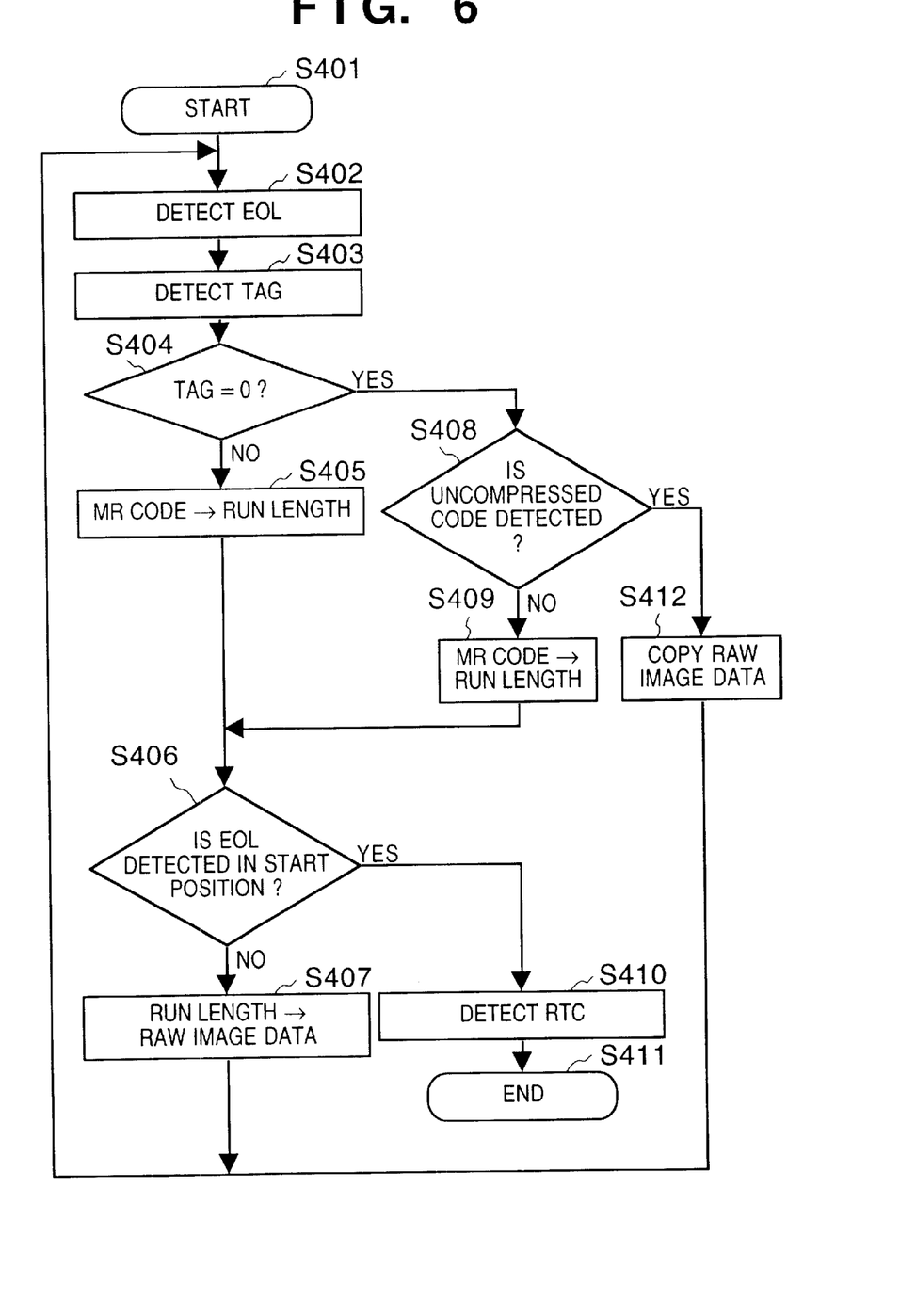
FIG. 6 is a flow chart for decoding MR codes using non-compression together.

FIG. 6 is a flow chart showing the operation of decoding MR codes using non-compression together. The flow starts from step S401, and EOL code detection is performed in step S402. In step S403, the TAG bit is detected to determine whether this line is MH codes or MR codes. If the TAG bit is 0 in step S404, coded data of the line is MH codes or uncompressed image data, so the flow branches to step S408. If the TAG bit is 1, coded data of the line is MR codes, so the flow continues to processing starting from step S405.

In step S405, MR codes are converted into run-length data, and the flow advances to step S406. In step S408, on the other hand, uncompressed code detection is performed. If an uncompressed code is detected, the flow branches to step S412; if not, MH codes are converted into run-length data in step S409, and the flow advances to step S406. In step S406, whether the EOL is detected in the start position of the coded data in step S402 is checked. If the EOL is detected in the start position of the coded data, the flow branches to step S410 by regarding the two consecutive EOLs as a part of the RTC. If not, the run-length data generated in step S405 is converted into a raw image in step S407, and the flow returns to step S402. If the flow branches to step S410, the RTC is detected, and the operation is ended in step S411. On the other hand, if an uncompressed code is detected in step S408, the flow advances to step S412, and data following the uncompressed code, the original one-line data, and the input data are directly output. After that, the flow returns to step S402.

Figure 7:
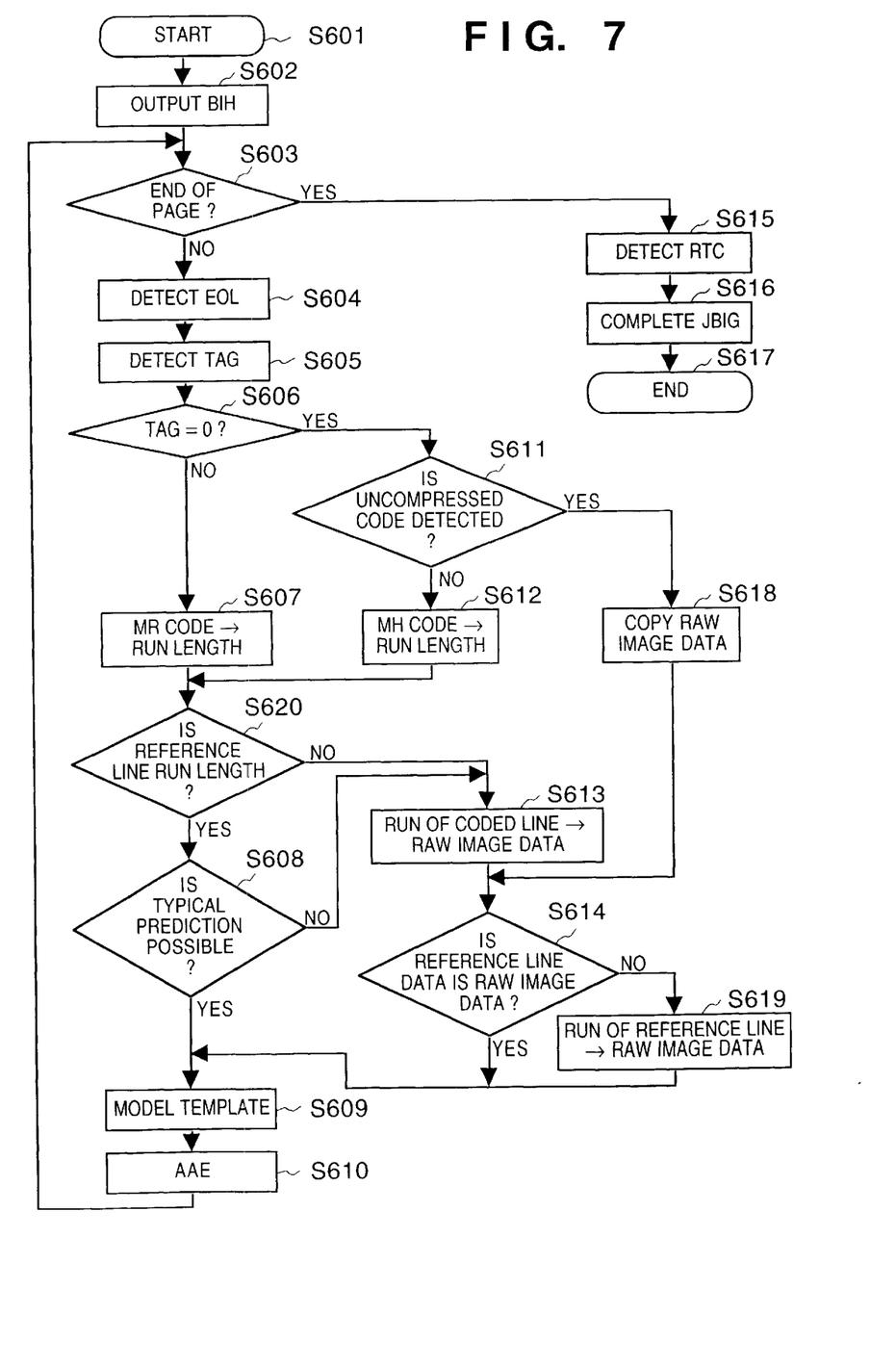
FIG. 7 is a flow chart showing code conversion from MR codes using non-compression together into JBIG codes according to the embodiment of the present invention.

The conversion from MR codes using non-compression together to JBIG codes as the characteristic feature of this embodiment will be described in detail below with reference to the flow chart in FIG. 7. FIG. 7 is obtained by embedding a process of encoding to JBIG into the flow chart of the operation of decoding non-compression accompanying MR shown in FIG. 6.

The flow starts from step S601. In step S602, a BIH as a header file of JBIG is generated and output. A detailed description of the format of this binary image header (BIH) will be omitted since it is described in the aforementioned ITU-T recommendation. In step S603, whether processing of one page is completed is checked. If NO in step S603, the flow advances to step S604. If the processing of one page is completed, the flow branches to step S615. The end of page of a common MR code is detected by detecting consecutive EOLs as explained in FIG. 6. However, the number of lines per page is already known in a code conversion process, so the end of page is detected by comparing the preset number of lines per page with the line count value. If it is determined in step S603 that the processing of one page is completed, the flow advances to step S615 to detect an RTC from the input non-compression accompanying MR coded data. In step S616, a process of completing JBIG encoding is performed. In step S617, this operation is ended.

In step S604, an EOL is detected from the input uncompressed MR coded data. In step S605, a TAG bit is detected to check whether the one-line coded data is uncompressed original image data, MH codes as horizontal (one-dimensional) codes, or MR codes as vertical (two-dimensional) codes. If the TAG bit is 0 indicative of uncompressed original image data or MH codes, the flow advances to step S611. If the TAG bit is 1 indicative of MR codes, the flow advances to step S607.

In step S607, run-length data of one line as intermediate data is generated from the input MR coded data as vertical codes. In step S611, uncompressed code detection is performed subsequently to the TAG detection. If no uncompressed code is detected, the flow advances to step S612 to generate run-length data as intermediate data from the input MH coded data as horizontal codes. The one-line run-length data generated in step S607 or S612 is temporarily stored so as to be used in typical prediction, and as reference line data, later.

This run-length data is held until processing of the next line so as to be used as a reference line in a typical prediction determination process using the run length of the next line. In step S620, whether run-length data is held as a reference line is checked. If no run-length data is held as a reference line, this reference line is an uncompressed line. In this case, therefore, the probability that typical prediction is possible is extremely low. Accordingly, if no run-length data is held as a reference line in step S620, the flow branches to step S613. If not, the flow advances to step S608 to perform typical prediction using run-length data. This run-length data is compare d with run-length data of the preceding line to check whether typical prediction is possible (step S608). If typical prediction is possible, SLNTP as a temporary pixel is generated as described previously. In step S610, AAE (arithmetic encoding) is performed on the basis of a model template obtained in step S609 for this temporary pixel. After that, the flow returns to step S603.

If it is determined in step S608 that typical prediction is impossible, raw image data is once generated from run-length data of the coded line in order to perform arithmetic encoding from the raw image data (step S613). If an uncompressed code is detected in step S611, this line is an uncompressed coded line, so the input data (raw image data) is copied (step S618) and the flow advances to step S614. In step S614, whether data of a reference line of uncompressed codes (including decoded data) for forming a model template is generated is checked.

If no such data is generated, the flow advances to step S619 to convert the run-length data currently stored as reference line data into raw image data, thereby generating reference line data composed of uncompressed codes. This is so because if typical prediction is possible, run-length data is used as reference line data. If the reference line data is thus obtained, the flow advances to step S609 to generate a model template. In step S610, arithmetic encoding (AAE) is performed for one line, and the flow returns to step S603. In FIG. 7, a model template and arithmetic encoding (AAE) are separated. However, to encode one line, a model template is formed for each pixel and arithmetic encoding (AAE) is performed.

In this embodiment, no TP pre-processing is performed for uncompressed lines. This is because, although the encoding efficiency changes in some cases, the operation amount for determination of the TP processing is limited by the upper limit of the number of run-length data used in non-compression determination, and this increases the processing speed.

As explained in this flow chart, since typical prediction is performed using run-length data, the prediction can be performed with a smaller operation amount than when it is performed from raw image data. Furthermore, if typical prediction hits continue, conversion from the run length as intermediate data to a raw image can be skipped. This realizes high-speed processing.

Figure 8:
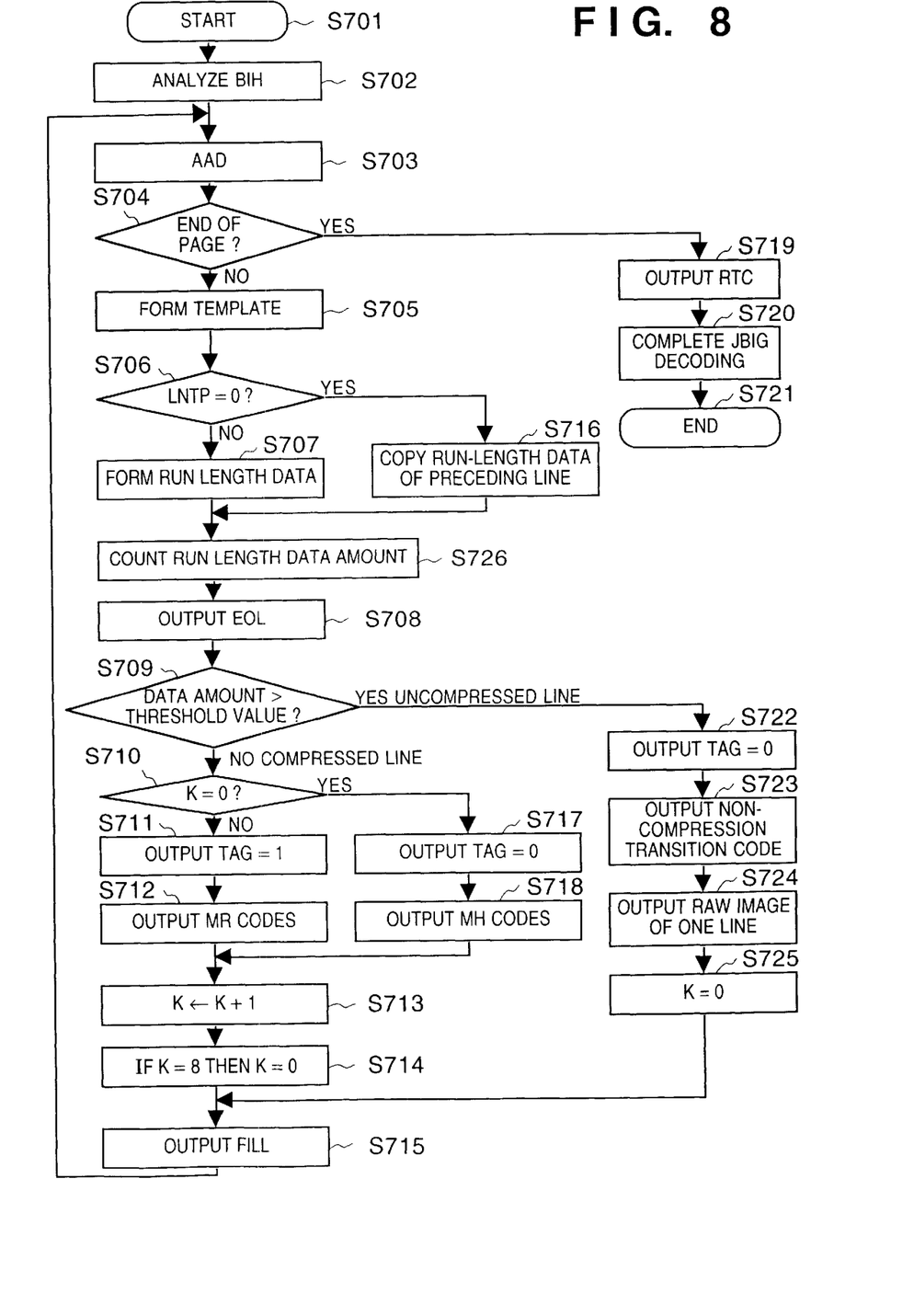
FIG. 8 is a flow chart showing code conversion from JBIG codes into MR codes using non-compression together according to the present invention.

FIG. 8 is a flow chart for converting JBIG codes into MR codes using non-compression together according to this embodiment. To simplify the explanation, the branch of JBIG marker code processing is omitted from FIG. 8.

The flow starts from step S701. In step S702, a header BIH of input JBIG codes is analyzed, and a parameter necessary for JBIG decoding is extracted. Arithmetic decoding (AAD) is performed in step S703, and the end of page is checked in step S704. The end of page is detected by comparing a Yd (vertical direction pixel number) set value of the BIH with a line counter or by a NEWLEN marker code. When processing of one page is completed, the flow branches to step S719 to output an RTC of non-compression accompanying MR codes. In step S720, a JBIG decoding completing process is performed. In step S721, the operation is ended.

In step S705, a template is formed on the basis of the result of arithmetic decoding (AAD) in step S703. The value of LNTP is detected from SLNTP at the start position of a line (step S706). If LNTP=0, typical prediction is possible, so run-length data formed from the preceding line is copied to form run-length data of this line. If LNTP=1, run-length data is formed from raw image data generated after the one-line arithmetic decoding in step S703 and the template formation in step S705. The amount of run-length data formed in step S707 or S716 is counted (step S726).

When the run-length data formation in step S707 or S716 is completed, the flow advances to step S708 to output an EOL. Processing from step S709 is analogous to the non-compression accompanying MR encoding process described earlier with reference to FIG. 5. That is, if in step S709 the run-length data amount counted in step S726 exceeds a certain specific threshold value, it is determined that this line is an uncompressed line, and the flow branches to uncompressed line processing starting from step S722. If not, a normal MR coded data output process starting from step S710 is performed.

If the line is not an uncompressed line, the flow advances to step S710 to check whether a counter for a K parameter is 0 is checked. Assume that the K parameter is set to 8 in this embodiment. On the basis of the result, which of MH codes as horizontal codes or MR codes as vertical codes are to be output is determined. To generate MR codes, the flow advances to processing starting from step S711. To generate MH codes, the flow branches to step S717.

First, the generation of MR codes will be described. In step S711, 1 is output as a TAG bit indicative of an MR coded line. In step S712, the run-length data generated in step S707 or S716 is used to process one-line MR codes and output coded data. In step S713, the counter of the K parameter described above is updated by incrementing the counter by one. In step S714, whether the counter value of the K parameter is equal to the preset K parameter value (8) is checked. If the two values are equal, the counter is returned to 0. In step S715, a FILL bit 0 for matching the data boundary with byte padding is output, and the flow returns to step S703.

To generate MH codes, 0 is output in step S717 as a TAG bit indicating that this line is MH codes. In step S718, the run-length data generated in step S707 or S716 is used to generate and output one-line MH codes. The processes in steps S713, S714, and S715 are performed in the same manner as for MR codes, and the flow returns to step S703.

To generate an uncompressed line, 0 indicative of a horizontal code is output as a TAG bit in step S722. In step S723, a non-compression transition code "000000001" indicating that this line is uncompressed is output. If in step S724 LNTP=0 which indicates that the one-line raw image obtained by the JBIG decoding process in the preceding stage is directly output, the raw image already formed from the preceding line is copied and output. In step S725, the K parameter counter is set to 0. In step S715, FILL is output, and the flow returns to step S703.

In the above embodiment, code conversion between MR codes using uncompressed codes together and JBIG has been described. However, instead of MR codes using uncompressed codes together, it is also possible to use MH codes using non-compression together or normal MH codes, MR codes, or MMR codes. In the case of normal MH codes, MR codes, or MMR codes, depending on an image the amount of run-length data is sometimes larger than the amount of raw image data, unlike when uncompressed codes are used together. This may increase the amount of the process for determining TP. To avoid this inconvenience, when code conversion is performed between normal MH codes, MR codes, or MMR codes and JBIG, use of a run length or raw image is switched in TP determination in accordance with the data amount of run length.

Also, an image data enlargement/reduction process such as paper size conversion is sometimes inserted into the code conversion process. Even in this case the effectiveness of this embodiment can be maintained by performing conversion from run-length data to run-length data as this enlargement/reduction process.

The application of the present invention is not limited to a facsimile apparatus, i.e., the present invention is applicable to a code conversion process in any apparatus. Furthermore, the present invention can be applied to color images as well as to black-and-white images. If this is the case, a color image is separated into planes in units of primary colors, and the present invention is applied to each plane. Additionally, coded data to be processed is not restricted to image data.

The present invention can be applied to a system constituted by a plurality of devices (e.g., a host computer, interface, reader, and printer) or to an apparatus (e.g., a copying machine or facsimile) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the embodiments, and the storage medium storing the program codes constitutes the invention.

Further, as the storage medium for providing the program codes, it is possible to use, e.g., a floppy disk, hard disk, optical disk, magnetooptical disk, CD-ROM, CD-R, magnetic tape, nonvolatile memory card, and ROM.

Furthermore, besides aforesaid functions according to the above embodiments are realized by executing the program codes which are read by a computer, the present invention includes a case where an OS (Operating System) or the like working on the computer performs a part or the whole of actual processing in accordance with designations by the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or the whole of actual processing in accordance with designations of the program codes and realizes functions of the above embodiments.

When the present invention is applied to the storage medium, this storage medium stores program codes corresponding to the aforementioned flow charts. Briefly, of the processes shown in the flow charts of FIGS. 7 and 8, the storage medium stores at least the process for performing typical prediction using run-length data.

As has been described above, the present invention achieves the effects of reducing the time of decoding during code conversion and greatly reducing the arithmetic operation during re-encoding. Especially when image encoding is performed by applying the present invention to a coding system accompanying typical prediction, the load of code conversion can be greatly improved because the typical prediction is generally possible at a probability of about 40% in the case of character/line images. Consequently, the present invention can constitute a high-speed code converting method and apparatus.

As many apparently widely different embodiments of the present invention can be made without departing from the spirit and scope thereof, it is to be understood that the invention is not limited to the specific embodiments thereof except as defined in the appended claims.

What is claimed is:

1. A coding method of coding input data by using typical prediction, characterized in that the input data is coded by a coding method different from a coding method using the typical prediction, and the typical prediction is performed by using the coded data.

2. The method according to claim 1, characterized in that the data coded by the different coding method is data coded by a coding method using run-length information.

3. The method according to claim 1, characterized in that arithmetic coding is performed after the typical prediction.

4. The method according to claim 1, characterized in that the input data contains coded data and uncoded data, and the typical prediction is performed for the coded data.

5. A coding method of coding input data by using typical prediction, characterized in that
the input data is coded by a coding method different from a coding method using the typical prediction, and
the typical prediction is performed by using the input data if an amount of the coded data is smaller than an amount of data to be coded by the different coding method, and by using the data to be coded by the different coding method if not.

6. A code converting method of converting first coded data coded by a first coding method using typical prediction into second coded data coded by a second coding method different from the first coding method, characterized by comprising the step of converting a portion of the first coded data, which is found to be typically unpredictable by the typical prediction, into intermediate data of the second coding method.

7. The method according to claim 6, characterized in that a data format subjected to the typical prediction is equal to the intermediate data.

8. The method according to claim 6, characterized in that the first coded data contains a portion formed by coding data having the same format as the intermediate data and a portion formed by coding original data.

9. The method according to claim 6, characterized in that the format of the intermediate data is a run-length code format.

10. The method according to claim 9, characterized in that the second coding method is one of MH, MR, and MMR.

11. A code converting method of converting first coded data formed by coding original data by a first coding method into second coded data coded by a second coding method, characterized by comprising:
the conversion step of converting the first coded data into intermediate data between the first coded data and the original data;
the prediction step of performing typical prediction by using a predetermined unit of the intermediate data and obtaining a prediction result; and
the encoding/decoding step of encoding the intermediate data into the second coded data if the prediction result indicates that the typical prediction is possible, and decoding the intermediate data into the original data and performing the second coding if the prediction result indicates that the typical prediction is impossible.

12. A code converting method of converting first coded data formed by coding original data by a first coding method into second coded data coded by a second coding method, wherein the second coding is a typical predicting prediction coding and performed by using intermediate data generated in performing the first coding method.

13. The method according to claim 12, characterized in that the second coding method performs coding for each predetermined unit of input data by using a correlation between input data of two adjacent predetermined units.

14. The method according to claim 13, characterized in that the intermediate data has a third coded data portion and an original data portion, and the coding using the input data correlation is performed for the third coded data portion.

15. The method according to claim 14, characterized in that the third coded data portion is run-length coded.

16. The method according to claim 12, characterized in that the intermediate data is run-length coded.

17. A coding apparatus comprising:
typical predicting means for performing typical prediction for input data; and
coding means for performing a predetermined coding method using the typical prediction,
wherein the input data is coded by a coding method different from the predetermined coding method and the typical prediction is performed by using the coded input data.

18. The apparatus according to claim 17, characterized by further comprising arithmetic coding means.

19. The apparatus according to claim 17, characterized by further comprising:
data discriminating means for discriminating between coded data and uncoded data of the input data; and
filter means for supplying only coded data to said typical predicting means.

20. A code converting apparatus for converting first coded data coded by a first coding method using typical prediction into second coded data coded by a second coding method different from the first coding method, characterized by comprising:
detecting means for detecting, from the first coded data, a portion found to be typically unpredictable by the typical prediction; and
converting means for converting the detected portion into intermediate data in the second coding method.

21. A code converting apparatus for converting first coded data formed by coding original data by a first coding method into second coded data coded by a second coding method, characterized by comprising:
converting means for converting the first coded data into intermediate data between the first coded data and the original data;
predicting means for performing typical prediction for each predetermined unit of the intermediate data and outputting a prediction result; and
encoding/decoding means for encoding predetermined range of the intermediate data found to be typically predictable by the prediction result, and decoding predetermined range found to be typically unpredictable into the original data and encoding the original data into the second coded data.

22. The apparatus according to claim 21, characterized in that said predicting means performs the typical prediction by using a correlation between adjacent predetermined units of the intermediate data.

23. The apparatus according to claim 21, characterized by further comprising:
detecting means for detecting a coded data portion of the intermediate data; and
filter means for supplying only the coded data portion of the intermediate data to said predicting means.

24. An image forming apparatus for encoding and outputting image data, comprising:
image data input means;
first encoding means for encoding the image data by a first coding method and saving the data as first coded data;
decoding means for decoding the first coded data into intermediate coded data generated in a course of encoding by the first coding method; and second encoding means for encoding the intermediate coded data by a second coding method, which is a typical prediction coding and different from the first coding method, and outputting the data as second coded data.

25. The apparatus according to claim 24, characterized in that the first coding method uses run-length information, and the intermediate coded data is run-length information.

26. The apparatus according to claim 25, wherein the coding method using run-length information is one of MH, MR, and MMR.

27. The apparatus according to claim 24, characterized in that the second coding method includes typical prediction and arithmetic coding.

28. A coding apparatus for coding input data by using typical prediction, comprising:
   predicting means for performing the typical prediction;
   coding means for coding the input data on the basis of a prediction result from said predicting means,
   wherein the input data is coded by a coding method different from the coding method using the typical prediction, and
   wherein said predicting means performs the typical prediction by directly using the coded input data.

29. A coding apparatus for coding input data by using typical prediction, wherein the input data is formed by coding original data by a coding method different from a coding method using the typical prediction, and wherein said apparatus comprises:
   predicting means for performing the typical prediction;
   coding means for coding the input data on the basis of a prediction result from said predicting means; and
   original data amount detecting means for detecting an amount of the original data,
   wherein said predicting means performs the typical prediction by directly using the input data if the amount of the original data is smaller than an amount of the input data, and performs the typical prediction by using the original data if not.

30. A coding apparatus for converting first coded data coded by a first coding method using typical prediction into second coded data coded by a second coding method different from the first coding method, characterized by comprising:
   detecting means for detecting, from the first coded data, a portion found to be typically unpredictable by the typical prediction; and
   data converting means for converting the portion found to be typically unpredictable into intermediate data of the second coding method.

31. A coding apparatus for converting first coded data formed by coding original data by a first coding method into second coded data coded by a second coding method, characterized by comprising:
   converting means for converting the first coded data into intermediate data between the first coded data and the original data;
   predicting means for performing typical prediction using a predetermined unit of the intermediate data and obtaining a prediction result; and
   encoding/decoding means for encoding the intermediate data into the second coded data if the prediction result indicates that the typical prediction is possible, and decoding the intermediate data into the original data and performing the second coding if the prediction result indicates that the typical prediction is impossible.

32. A coding apparatus for converting first coded data formed by coding original data by a first coding method into second coded data coded by a second coding method, comprising:
   decoding means for decoding the first coded data into intermediate data generated in a course of performing the first coding method; and
   encoding means for performing the second coding by using the intermediate data,
   wherein the second coding is a typical prediction coding.

33. A computer readable storage medium storing a control program of an image forming apparatus for coding and outputting image data, comprising:
   a program of an image data input step;
   a program of a first encoding step, of encoding the image data by a first coding method and saving the data as first coded data;
   a program of a decoding step, of decoding the first coded data into intermediate coded data generated in encoding by the first coding method; and
   a program of a second encoding step, of encoding the intermediate coded data by a second coding method, which is a typical prediction coding and different from the first coding method, and outputting the data as second coded data.

34. A computer readable storage medium storing a control program of a coding apparatus for coding input data by using typical prediction, comprising:
   a program of a prediction step, of performing the typical prediction; and
   a program of a coding step, of coding the input data on the basis of a prediction result in the prediction step,
   wherein the input data is coded by a coding method different from the coding method using the typical prediction, and
   the prediction step comprises performing the typical prediction by directly using the coded input data.

35. A computer readable storage medium storing a control program of a coding apparatus for coding input data by using typical prediction, characterized in that
   the input data is coded by a coding method different from a coding method using the typical prediction,
   said storage medium comprises:
      a program of the prediction step of performing the typical prediction;
      a program of the coding step of coding the input data on the basis of a prediction result in the predicting step; and
      a program of the original data amount detection step of detecting an amount of original data before the input data is coded by the different coding method, and
      the prediction step comprises performing the typical prediction by directly using the input data if the amount of the original data is smaller than an amount of the input data, and performs the typical prediction by using the original data if not.

36. A computer readable storage medium storing a control program of a coding apparatus for converting first coded data coded by a first coding method using typical prediction into second coded data coded by a second coding method different from the first coding method, characterized by comprising:
   a program of the detection step of detecting, from the first coded data, a portion found to be typically unpredictable by the typical prediction; and a program of the data conversion step of converting the portion found to be typically unpredictable into intermediate data of the second coding method.

37. A computer readable storage medium storing a program code of a coding apparatus for converting first coded data formed by coding original data by a first coding method into second coded data coded by a second coding method, characterized by comprising:

a program of the conversion step of converting the first coded data into intermediate data between the first coded data and the original data;

a program of the prediction step of performing typical prediction using a predetermined unit of the intermediate data and obtaining a prediction result; and a program of the encoding/decoding step of encoding the intermediate data into the second coded data if the prediction result indicates that the typical prediction is possible, and decoding the intermediate data into the original data and performing the second coding if the prediction result indicates that the typical prediction is impossible.

38. A computer readable storage medium storing a control program of a coding apparatus for converting first coded data formed by coding original data by a first coding method into second coded data coded by a second coding method, comprising:

a program of a decoding step, of decoding the first coded data into intermediate data generated in a course of performing the first coding method; and a program of an encoding step, of performing the second coding by using the intermediate data, wherein the second coding is a typical prediction coding.

* * * * *